Sept. 27, 1932.  F. W. GEHRKE  1,879,179
MECHANICALLY GRINDING CONCAVE LENSES
Filed April 1, 1929
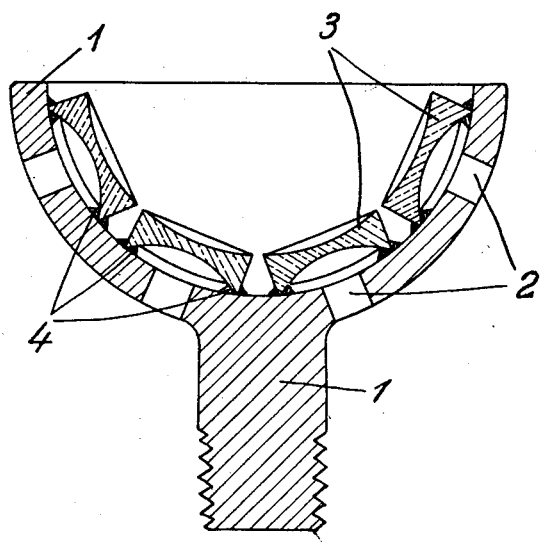
Friedrich Wilhelm Gehrke,
by Philip S. Hopkins, Attorney.

Patented Sept. 27, 1932

1,879,179

UNITED STATES PATENT OFFICE

FRIEDRICH WILHELM GEHRKE, OF MUNICH, GERMANY, ASSIGNOR TO AGFA ANSCO CORPORATION, OF BINGHAMTON, NEW YORK, A CORPORATION OF NEW YORK

MECHANICALLY GRINDING CONCAVE LENSES

Application filed April 1, 1929, Serial No. 351,772, and in Germany April 4, 1928.

The present invention relates to a process of mechanically grinding concave lenses. More particularly it relates to a method of securing lens blanks in a head stock in which a plurality of glass discs are ground and polished on both surfaces and to a device suitable for the said grinding and polishing process.

I found it to be possible to grind and finish both faces of a large number of concave lenses of any desired thickness if the glass discs cut to the correct thickness and exact diameter are so mounted and cemented in a head stock of spherical calotte form that their edges rest directly on the surface of the head stock. The edges of the lenses are advantageously cemented onto the surface of the head stock merely by a narrow ring of cement. In this manner the duration of the operation, and therefore the costs, are considerably diminished without any sacrifice of accuracy in the lens.

A feature of my invention is a head stock for mechanically grinding concave lenses which head stock is provided with perforations through which the instrument for measuring the thickness of the lenses cemented radially over these perforations can be inserted.

The proceeding of mechanically grinding lenses according to my invention is as follows:

In the first place the lens discs are cut and previously ground to the correct thickness of the edge and the exact diameter. The first grinding of the lens face is performed in the head stock in the usual manner, only in cementing the lens disc in place care must be taken that the edge of the lens rests directly on the surface of the head stock of spherical calotte form and that the cement should not, as hitherto, form the bed for the edge of the lens.

In contrast with the old process, the second face of the lens is also ground in the head stock. In cementing the lens in the head stock as in the first grinding, care must be taken that the edge of the lens rests on the surface of the head stock and further that the lens lies radially over a perforation in the head stock which is provided for the purpose of following progress of the grinding operation continuously by means of a caliper device inserted through the opening.

In cementing the lens in place, care must further be taken that between the opening in the head stock and the surface of the lens which is to be tested with the caliper device, there should be no disturbing cement; the cementing, therefore, is to be limited to a comparatively narrow zone of the rim of the lens. While the cement between the head stock and the lens may be of the usual kind in the case of thick lenses, in the case of thinner lenses it is necessary to have recourse to a suitable cold cement. Cements requiring heat in their use necessitate warming of the head stock and of the lens. Strains are thus set up which in the case of thin lenses generally produce change of form. Owing to the different expansion coefficients of metal, cement and glass, these strains and changes of form in the lenses remain even when the cement is cold, so that de-formed lenses are produced, and on being then finished are found on removal from the head stock to have non-spherical faces. By using a cold cement for holding the lens in the grinding and polishing operation in the head stock, these changes of form are avoided. Cold cement has further advantages, such as cleanliness, economy, and certainty of operation.

The accompanying drawing is an axial section through a head stock 1 of spheric calotte form, provided with perforations 2, the lenses 3 are cemented by narrow rings of cement to the inner surface of the head stock so as to be each co-axial with the corresponding perforation 2.

I claim:—

1. In the process of mechanically grinding and polishing simultaneously a plurality of concave lenses in a head stock of spherical calotte form, the steps which comprise placing the glass discs cut and ground to the desired thickness and diameter to rest with their edges immediately on the surface of the head stock in such a manner that they lie radially over the perforations provided in the head stock, attaching them to the latter with a narrow annulus of cement, surrounding only the rim of the glass discs, grinding one face of the lenses, inverting the latter and securing them in the same manner as in the first grinding operation, grinding the second face of the lenses and controlling the progress of the grinding operation with a measuring device inserted through the said perforations.

2. In the process according to claim 1, the use of a cement which consists of a cold cement.

In testimony whereof, I affix my signature.

FRIEDRICH WILHELM GEHRKE.